United States Patent Office 3,726,900
Patented Apr. 10, 1973

3,726,900
DIBENZO (a–d) CYCLOHEPTADI (OR TRI) ENE-5:2′-DIOXALANES (i,3′)
Claude P. Fauran, Paris, Jeannine A. Eberle, Chatou, Guy M. Raynaud, Paris, Claude J. Gouret, Meudon, Janine M. Thomas, Neuilly, and Gerard J. Huguet, Malesherbes, France, assignors to Delalande S.A., Courbevoie, Hauts-de-Seine, France
No Drawing. Filed Apr. 12, 1971, Ser. No. 133,441
Claims priority, application France, Apr. 15, 1970, 13,522; Feb. 19, 1971, 7105662
Int. Cl. C07d 13/04
U.S. Cl. 260—340.9                    5 Claims

ABSTRACT OF THE DISCLOSURE

A compound of the formula

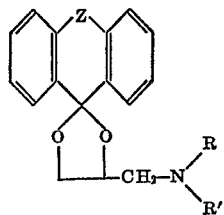

in which Z is —CH₂—CH₂— or —CH=CH—, and R and R′ each is an alkyl 1–3C or

is pyrrolidino, piperidino, hexamethyleneimino or morpholino. The compounds are prepared by condensing, in the presence of stannic chloride in chloroform or carbon tetrachloride, an epibromohydrin with dibenzo (a–d) cycloheptadi (or tri) enone. This intermediate is then condensed, in benzene with a secondary amine to obtain the compound. The compounds possess analgesic, sedative, antihistaminic, anti-serotonenic, anti-inflammatory, anticonvulsant and anti-depressant properties.

---

The present invention has for its object new derivatives of 4′-aminomethyl spiro [dibenzo (a–d) cycloheptadi (or tri) ene-5:2′-dioxolane (1′,3′)] their method of preparation and their therapeutic application.

The new compounds according to the present invention correspond to the general formula:

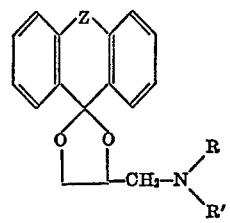

in which Z represents a —CH₂—CH₂— or a

—CH=CH— bridge and R and R′ represent alkyl groups having from one to three carbon atoms or alternatively, together with a nitrogen atom to which they are attached, form a heterocyclic group selected from the group consisting of pyrrolidino, piperidino, hexamethyleneimino and morpholino radicals.

The process according to the present invention consists, in a first stage, of preparing the 4′-bromomethyl spiro [dibenzo (a–d) cycloheptadi (or tri) ene-5:2′-dioxolane (1′,3′)] of the formula:

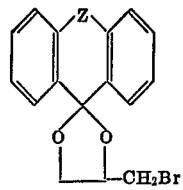

by condensing, in the presence of stannic chloride in chloroform or carbon tetrachloride the epibromohydrin of the formula:

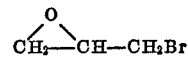

and the dibenzo (a–d) cycloheptadi (or tri) enone of the formula:

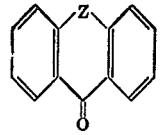

in which Z has the same significance as in Formula I. The second stage of the reaction is to condense, in a benzene medium, a secondary amine of the formula:

in which R and R′ have the same significance as in Formula I, on the derivative of Formula II.

The preparation of the maleate of 4-pyrrolidinomethyl spiro [dibenzo (a–d) cycloheptadiene-5:2′-dioxolane (1′, 3′)] and also the maleate of 4′-pyrrolidinomethyl spiro [dibenzo (a–d) cycloheptatriene-5:2′ dioxolane (1′,3′)] are given below by way of non-limitative example so as to illustrate the invention.

EXAMPLE I

The maleate of 4′-pyrrolidinomethyl spiro [dibenzo (a–d) cycloheptadiene 5:2′ dioxolane (1′,3′)].

1st stage.—Preparation of 4′-bromomethyl spiro [dibenzo (a–d) cycloheptadiene 5:2′ dioxolane (1′,3′)]

Reference Number 69,288

Dibenzocycloheptadienone (62 g.) and epibromohydrin (50 g.) are dissolved in carbon tetrachloride (300 ml.). The mixture is cooled to 5° C., and then stannic chloride (11 g.) dissolved in carbon tetrachloride (100 ml.) is slowly added thereto. After three hours of contact at this temperature, sodium hydroxide is added to make the mixture alkaline. The organic phase is then washed several times with water. After concentration of the organic phase, the expected product is obtained in a crude form, which is then recrystallised from isopropyl alcohol.

2nd stage.—Preparation of 4'-pyrrolidinomethyl spiro [dibenzo (a–d) cycloheptadiene 5:2' dioxolane (1',3')]

The 4'-bromomethyl spiro [dibenzo (a–d) cycloheptadiene-5:2' dioxolane (1',3')] (6 g.) obtained from the first stage is dissolved in benzene (10 ml.) and pyrrolidine (5.3 g.) is added thereto. The mixture is boiled under reflux, with agitation, for eight hours. After cooling, the benzene solution is washed with water. The organic phase is then concentrated under reduced pressure to recover the corresponding pyrrolidinomethyl derivative.

3rd stage

The compound obtained in the second stage is dissolved in acetone and converted into the maleate by the addition of a calculated quantity of maleic acid.

The compound obtained had the following characteristics:

Melting point: 152° C.
Yield: 76%
Empirical formula: $C_{26}H_{29}NO_6$

*Elementary analysis.*—Calculated (percent): C, 69.16; H, 6.47; N, 3.10. Found (percent): C, 69.36; H, 6.45; N, 3.27.

EXAMPLE II

Maleate of 4'-pyrrolidinomethyl spiro [dibenzo (a–d) cycloheptatriene 5:2' dioxoloane (1',3')]

1st stage.—Preparation of 4'-bromomethyl spiro [dibenzo (a–d) cycloheptatriene 5:2' dioxolane (1',3')]

In a 250 ml. reaction vessel, provided with a stirrer, a condenser, a thermometer, a calcium chloride drying tube and an ampoule for introduction, dibromocycloheptatrienone (0.1 mole) is dissolved in chloroform (100 ml.). Stannic chloride (3.7 g.) is then added thereto. Finally, in four and a half hours, epibromohydrin (30 ml.: 0.122 mole) is added at a temperature between 18° C. and 20° C. The mixture is hydrolysed by a solution of sodium hydroxide (6.65 g.) in water (16.6 ml.). The expected product is extracted from the organic phase, washed and dried. It is then evaporated, recrystallised from acetone, washed with methanol and dried. The product had the following characteristics:

Melting point: 138° C.
Yield: 62%
Empirical formula: $C_{18}H_{15}BrO_2$

*Elementary analysis.*—Calculated (percent): C, 62.98; H, 4.41. Found (percent): C, 62.93; H, 4.45.

2nd stage.—Preparation of 4'-pyrrolidinomethyl spiro [dibenzo (a–d) cycloheptatriene 5:2' dioxolane (1',3')]

Reference Number 70301

In a 500 ml. reaction vessel, provided with a stirrer, a reflux condenser and a thermometer, the bromo-derivative (0.1 mole) obtained from the first stage and pyrrolidine (0.5 mole) are dissolved in benzene (100 ml.). The mixture is boiled under reflux for eight hours. After evaporation to dryness, the residue is treated with sodium hydroxide (2 N: 50 ml.) and ethyl acetate (150 ml.). The mixture is then washed with water, dried and evaporated. The crystalline evaporation product is treated with dilute hydrochloric acid (2 N) and ethyl acetate (250 ml.). The aqueous phase is made alkaline with sodium hydroxide (2 N) and the salted out expected product is extracted with ethyl acetate. It is then dried, evaporated and recrystallised from iso-propyl alcohol. The product has the following characteristics:

Melting point: 104.5° C.
Yield: 70%
Empirical formula: $C_{22}H_{23}NO_2$

*Elementary analysis.*—Calculated (percent): C, 79.25; H, 6.95; N, 4.20. Found (percent): C, 78.98; H, 6.91; N, 4.29.

3rd stage.—Preparation of the maleate of 4'-pyrrolidinomethyl spiro [dibenzo (a–d) cycloheptatriene 5:2' dioxolane (1',3,)]

The compound prepared in the second stage is treated with the equivalent amount of maleic acid in an ether-acetone medium. The precipitate formed is filtered, dried and recrystallised from absolute ethanol.

The product obtained had the following characteristics:

Melting point: 149.5° C.
Yield: 66%
Empirical formula: $C_{26}H_{27}NO_6$

*Elementary analysis.*—Calculated (percent): C, 69.47; H, 6.05; N, 3.12. Found (percent): C, 69.37; H, 6.22; N, 3.29.

The compounds shown in Tables I and II are prepared by the same method.

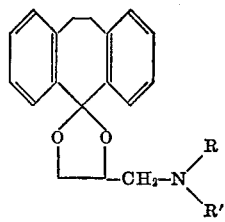

TABLE I

| Reference number | $-N\begin{matrix}R\\R'\end{matrix}$ | Salt | Empirical formula | Formula weight | Melting point, °C. | Overall yield, percent | Calculated C | Calculated H | Calculated N | Found C | Found H | Found N |
|---|---|---|---|---|---|---|---|---|---|---|---|---|
| 69197 | −N⟨⟩ (piperidine) | Maleate | $C_{27}H_{31}NO_6$ | 465.53 | 128 | 60 | 69.66 | 6.71 | 3.01 | 69.63 | 6.55 | 3.14 |
| 69257 | −N(CH₃)₂ |  | $C_{20}H_{23}NO_2$ | 309.39 | 72 | 45 | 77.65 | 7.49 | 4.53 | 77.63 | 7.61 | 4.73 |
|  |  | Maleate | $C_{24}H_{27}NO_6$ | 425.46 | 130 | 65 | 67.75 | 6.40 | 3.29 | 67.55 | 6.31 | 3.39 |
| 69291 | −N⟨⟩ (piperidine) | HCl | $C_{24}H_{30}ClNO_2$ | 399.95 | 215 | 55 | 72.07 | 7.56 | 3.50 | 72.04 | 7.70 | 3.50 |
| 69296 | −N⟨O⟩ (morpholine) | Maleate | $C_{26}H_{29}NO_7$ | 467.5 | 124 | 50 | 66.79 | 6.26 | 3.00 | 65.92 | 6.40 | 3.19 |
| 71136 | −N(C₂H₅)₂ | Oxalate | $C_{24}H_{29}NO_6$ | 427.4 | 155 | 72 | 67.43 | 6.84 | 3.28 | 67.28 | 6.72 | 3.22 |

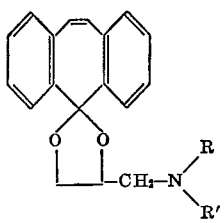

TABLE II

| Reference number | R / −N\R' | Form | Empirical formula | Molecular weight | Melting point, °C. | Overall yield, percent | Calculated C | Calculated H | Calculated N | Found C | Found H | Found N |
|---|---|---|---|---|---|---|---|---|---|---|---|---|
| 70312 | −N(CH₃)(CH₃) | Base | $C_{20}H_{21}NO_2$ | 307.38 | 132 | 75 | 78.15 | 6.89 | 4.56 | 78.27 | 6.92 | 4.69 |
|  |  | Maleate | $C_{24}H_{25}NO_6$ | 423.45 | 153.5 | 96 | 68.07 | 5.95 | 3.31 | 67.91 | 5.81 | 3.46 |
| 73307 | −N(C₃H₇)(C₃H₇) | Base | $C_{24}H_{29}NO_2$ | 363.48 | (¹) | 42 | 79.30 | 8.04 | 3.85 | 79.04 | 7.99 | 4.05 |
| 70315 | −N⟨pyrrolidine⟩ | do | $C_{23}H_{25}NO_2$ | 347.44 | 104 | 70 | 79.50 | 7.25 | 4.03 | 79.37 | 7.01 | 4.15 |
|  |  | Maleate | $C_{27}H_{29}NO_6$ | 463.51 | 145 | 72 | 69.96 | 6.31 | 3.02 | 70.02 | 6.32 | 3.12 |
| 70302 | −N⟨morpholine⟩ | Base | $C_{22}H_{23}NO_3$ | 349.41 | 136 | 85 | 75.62 | 6.64 | 4.01 | 75.42 | 6.56 | 4.10 |
|  |  | Maleate | $C_{26}H_{27}NO_7$ | 465.48 | 133 | 94 | 67.08 | 5.85 | 3.01 | 67.10 | 6.89 | 3.21 |
| 70303 | −N⟨piperidine⟩ | Base | $C_{24}H_{27}NO_2$ | 361.46 | 96 | 65 | 79.74 | 7.53 | 3.88 | 79.48 | 7.53 | 4.00 |
|  |  | Maleate | $C_{28}H_{31}NO_6$ | 477.54 | 140 | 97 | 70.42 | 6.54 | 2.93 | 70.23 | 6.43 | 3.06 |

¹ Boiling point = 225° C. (0.1 mm. Hg).

The compounds of Formula I have been tested in the laboratory on animals and have shown, in particular, analgesic, sedative, antihistaminic, anti-serotoninic, anti-inflammatory, anticonvulsant and antidepressant properties.

(1) Analgesic properties

The compounds of Formula I, administered orally to mice are capable of reducing the number of consecutive painful stretchings caused by the inter-peritoneal injection of phenyl benzoquinone.

The results obtained with a certain number of compounds of Formula I are set out in Table III below:

TABLE III

| Reference number | Dose administered | Percentage protection |
|---|---|---|
| 69197 | 50 | 65 |
| 69257 | 25 | 80 |
| 69288 | 150 | 70 |
| 69291 | 150 | 40 |
| 69296 | 50 | 75 |
| 70301 | 50 | 50 |
| 70302 | 110 | 50 |
| 70303 | 80 | 50 |
| 70312 | 37 | 50 |
| 70315 | 90 | 50 |

(2) Sedative properties

The compounds of Formula I, administered orally to mice, reduce the number of explorations in the escape enclosure and in actimetry with a pencil of rays and with photoelectric cells.

The results obtained with a certain number of these compounds are set out in Table IV below:

TABLE IV

| Reference number of compound tested | DE 50 sedative in— Escape enclosure, mg./kg./P.O. | Actimetry, mg./kg./P.O. |
|---|---|---|
| 70301 | 115 | 70 |
| 70303 |  | 75 |
| 70312 | 90 | 65 |
| 71315 | 120 | 65 |

(3) Antihistaminic properties

The compounds of Formula I, administered intravenously, are capable of opposing the broncho-constricting effects of histamine injected intravenously, these effects being determined by the Konzett and Rossler test.

The results obtained with a certain number of these compounds are set out in Table V below:

TABLE V

| Reference number of compound tested: | DE 50 antihistaminic |
|---|---|
| 70301 | 0.8 mg./kg./I.V. |
| 70302 | 2.5 mg./kg./I.V. |
| 70312 | 0.35 mg./kg./I.V. |
| 70315 | 1.7 mg./kg./I.V. |

(4) Anti-serotoninic properties

The compounds of Formula I, administered intravenously, are capable of opposing the broncho-constricting effects of serotonine injected intravenously, these effects being determined by the Konzett and Rossler test.

The results obtained with a certain number of these compounds are set out in Table VI below:

TABLE VI

| Reference number of compound tested: | DE 50 anti-serotoninic |
|---|---|
| 70301 | 0.40 mg./kg./I.V. |
| 70302 | 0.25 mg./kg./I.V. |
| 70312 | 0.35 mg./kg./I.V. |
| 70315 | 1.40 mg./kg./I.V. |

(5) Anti-inflammatory properties

These properties show themselves by a diminution of the local oedema, caused by the sub-plantar injection of a phlogogic agent such as carraghenine, in the rat following the oral administration of the compounds of Formula I. The results obtained with a certain number of these compounds are set out in Table VII below, the dose administered being 150 mg./kg./PO.

TABLE VII

| Reference number of compound tested: | Percentage reduction of the oedema, percent |
|---|---|
| 69296 | 40 |
| 70301 | 45 |
| 70303 | 50 |
| 70312 | 55 |
| 70315 | 45 |

(6) Anticonvulsant properties

The compounds of Formula I, preventively administered orally in mice reduce the mortality caused by the sub-cutaneous injection of nicotine and eserine and the tonic spasms caused by an electric shock.

The results obtained with a certain number of these compounds are set out in Table VIII below:

TABLE VIII

| | | Protection against— | | |
|---|---|---|---|---|
| Reference number of compound tested | Dose administered, mg./kg./P.O. | Nicotine, percent | Eserine, percent | Electric shock, percent |
| 71301 | 75 | 100 | 50 | 90 |
| 70302 | 150 | 100 | | |
| 70303 | 75 | 90 | | |
| 70312 | 75 | 100 | 100 | |
| 70315 | 75 | 100 | | |

(7) Anti-depressant properties

The compounds of Formula I, preventively administered orally in the rat, are capable of opposing the ptosis caused by the injection of reserpine.

Thus, the compounds numbered 70,312 and 70,315 respectively reduced the ptosis by 65% and 45% by a dose of 75 mg./kg./P.O.

(8) Spasmolytic properties

Added to the medium of survival of a fragment of the isolated duodenum of a rat, the compounds of Formula I preventively ensure an antagonism against the spasmogenic effects of barium chloride (papaverinic activity evaluated with respect to papaverine) and acetylcholine (atropinic activity evaluated with respect to atropine).

By way of example, the results obtained with a certain number of compounds of Formula I are set out in Table IX below:

TABLE IX

| Reference number | Papaverinic activity (× papaverine) | Atropinic activity (× atropine) |
|---|---|---|
| 69-197 | 1 | |
| 69257 | 2 | 0.01 |
| 69288 | 1 | 0.02 |
| 69291 | 1 | |

(9) Bronchodilatory properties

Injected intravenously, the compounds of Formula I are capable of opposing the bronchoconstriction in guinea-pigs caused by the intravenous injection of acetylcholine, the results being evaluated according to the method of Konzett.

By way of example, the injection of compound No. 69,257 causes an inhibition of 100%.

(10) Hypotensive properties

Injected intravenously, the compounds of Formula I cause a lowering of the arterial pressure in an anaesthetised rat.

By way of example, given in a dose of 1 mg./kg.I.V., compound No. 69,257 lowers the arterial pressure of an anaethetised rat by 50% for more than forty minutes.

As is shown by the preceding results and by those shown in Table X below, the difference the pharmacologically active doses and the lethal doses are sufficient to allow the use of compounds of the Formula I therapeutically.

TABLE X

| | Toxicity, DL 50, approximately (mice) | |
|---|---|---|
| Reference number of compound tested | Orally, mg./kg. | Intravenously, mg./kg. |
| 69197 | 800 | |
| 69257 | 750 | |
| 69288 | 1,400 | |
| 69291 | 1,400 | |
| 69296 | 1,500 | |
| 70301 | 425 | 26 |
| 70302 | >2,400 | 99 |
| 60303 | 800 | |
| 70312 | 360 | 32 |
| 70315 | 700 | 24 |

The compounds of Formula I are prescribed in the treatment of cases of migrainous, visceral, inflammatory and other pains, vascular spasms (with or without hypertension), asthma, inflammatory diseases and diseases of the respiratory tract as well as in cases of epilepsy, nervousness, irritability and, amongst these, of depression.

They are administered orally in the form of tablets, sugar-coated pills and gelules containing from 10 to 400 mg. of the active constituent (1 to 5 per day), rectally in the form of suppositions containing 10 to 200 mg. of active constituent (1 to 2 per day) and parenterally in the form of ampoules containing from 5 to 100 mg. of active constituent (1 to 2 per day).

What we claim is:

1. A compound of the formula

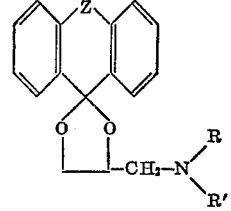

in which Z is —$CH_2$—$CH_2$— or —CH=CH—, and R and R' are alkyls having from one to three carbon atoms, or

is a heterocyclic radical selected from the group consisting of pyrrolidino, piperidino, hexamethyleneimino and morpholino, and the pharmaceutically acceptable acid addition salts thereof.

2. A compound as claimed in claim 1, wherein R and R' are selected from the group consisting of methyl, ethyl or propyl.

3. A compound as claimed in claim 1 wherein the compound is the maleate salt.

4. A compound as claimed in claim 1, in which Z is —$CH_2$—$CH_2$—, and R and R' both are methyl.

5. A compound is claimed in claim 1, in which Z is —CH=CH—, and R and R' both are methyl.

No references cited.

ALEX MAZEL, Primary Examiner

J. TOVAR, Assistant Examiner

U.S. Cl. X.R.

260—247.7 F, 326.5 D, 293.58; 424—278

UNITED STATES PATENT OFFICE
CERTIFICATE OF CORRECTION

Patent No. 3,726,900  Dated April 10, 1973

Inventor(s) Claude P. Fauran, Jeannine A. Eberle, Guy M. Raynaud, Claude J. Gouret, Janine M. Thomas and Gerard J. Huguet It is certified that error appears in the above-identified patent and that said Letters Patent are hereby corrected as shown below:

In the Title; change "(i,3')" to ---(1',3')---.

Signed and sealed this 20th day of November 1973.

(SEAL)
Attest:

EDWARD M. FLETCHER, JR.
Attesting Officer

RENE D. TEGTMEYER
Acting Commissioner of Patents